March 15, 1955   E. J. SCHAEFER   2,704,346
MOTOR CONTROL FOR SUBMERSIBLE SUMP PUMP
Filed Feb. 17, 1951   2 Sheets-Sheet 1

INVENTOR.
Edward J. Schaefer,
BY
Davis, Lindsey, Hibben + Noyes
Atty's.

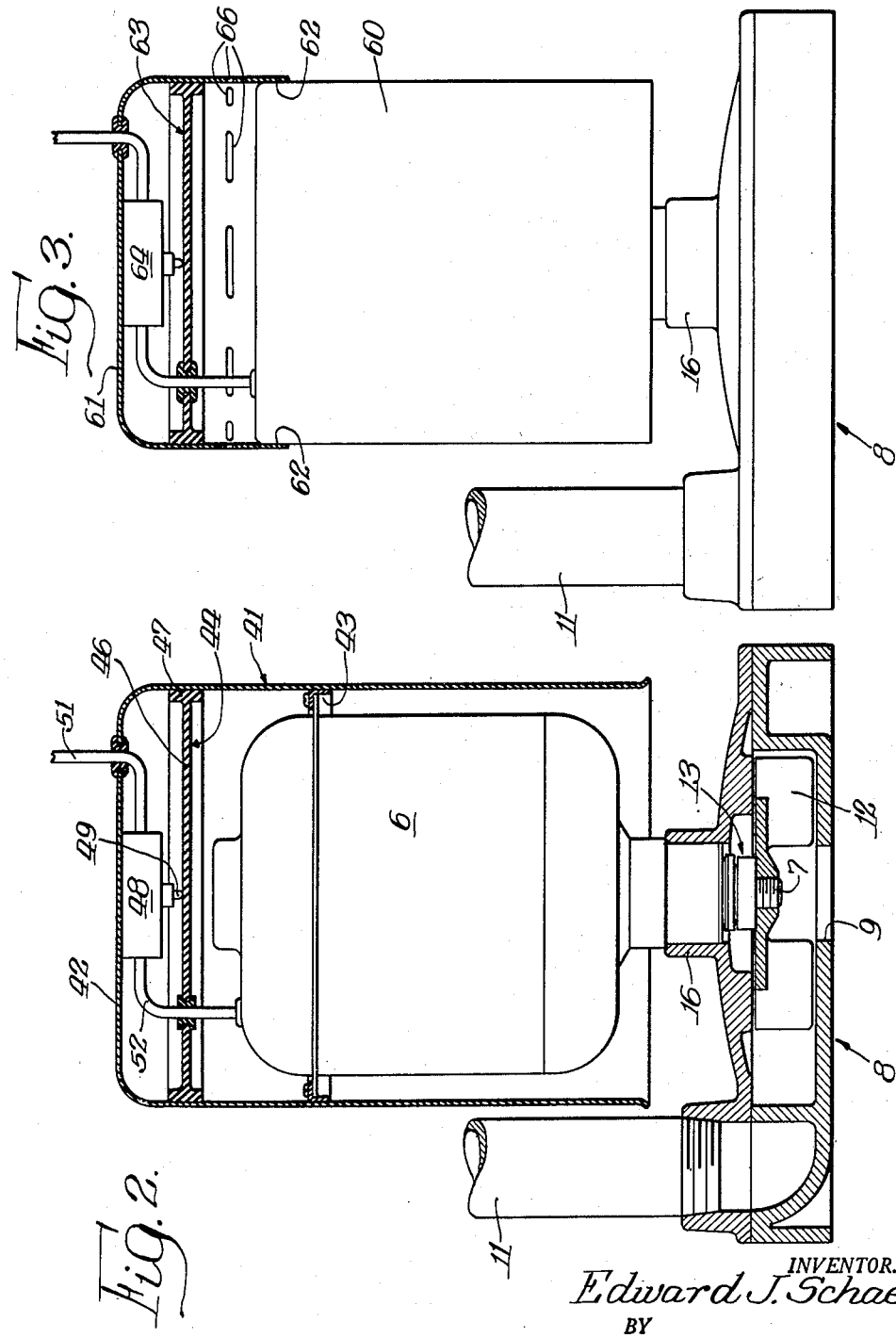

United States Patent Office 2,704,346
Patented Mar. 15, 1955

2,704,346

MOTOR CONTROL FOR SUBMERSIBLE SUMP PUMP

Edward J. Schaefer, Fort Wayne, Ind.

Application February 17, 1951, Serial No. 211,543

10 Claims. (Cl. 318—481)

This invention relates generally to sump pumps and more particularly to a novel arrangement of an electric motor and control means for use with sump pumps.

Sump pumps are widely used in homes, office buildings, and the like for the purpose of preventing flooding of basements due to seepage, backwater, inadequate sewer capacity, or other causes. For many years such devices have been made in the same general manner with a centrifugal pump unit adapted to be positioned at the bottom of the sump or pit, an electric motor adapted to be mounted remotely from the pump and preferably near the top of the sump out of all possible contact with water, and an elongated vertical drive shaft connecting the motor with the pump impeller. In order to provide automatic operation, it has also been a common practice to equip such a sump pump arrangement with a float control which operates the motor switch in response to changes of the water level in the sump.

My invention is directed to a simplified and improved sump pump arrangement wherein the electric motor is of the submersible type and may, therefore, be positioned immediately adjacent the pump unit and connected directly thereto. As will hereinafter appear, I also provide a novel and highly advantageous control means for automatically regulating the operation of the submersible motor.

Accordingly, a primary object of the invention is to provide a novel sump pump arrangement characterized by simplicity and compactness of construction and greater ease of installation as compared with the sump pump arrangements heretofore used.

Another object of my invention is to provide a novel and simplified sump pump arrangement wherein the motor is of the submersible type and may, therefore, be mounted closely adjacent the pump unit thereby eliminating the need for an elongated shaft between the motor and the pump impeller.

A further object of the invention is to provide a novel submersible electric motor which is especially adapted for use with a sump pump.

Still another object of the invention is to provide a submersible sump pump motor having enclosure means including also a novel control means for regulating the operation of the motor in response to changes in water level.

Other objects and advantages of the invention will become apparent from the subsequent detailed description of the invention taken in connection with the accompanying drawings wherein:

Fig. 2 is a sectional view similar to Fig. 1 but showing a modified form of my invention; and Fig. 3 is a similar view showing still another modification of the invention.

Figure 1:
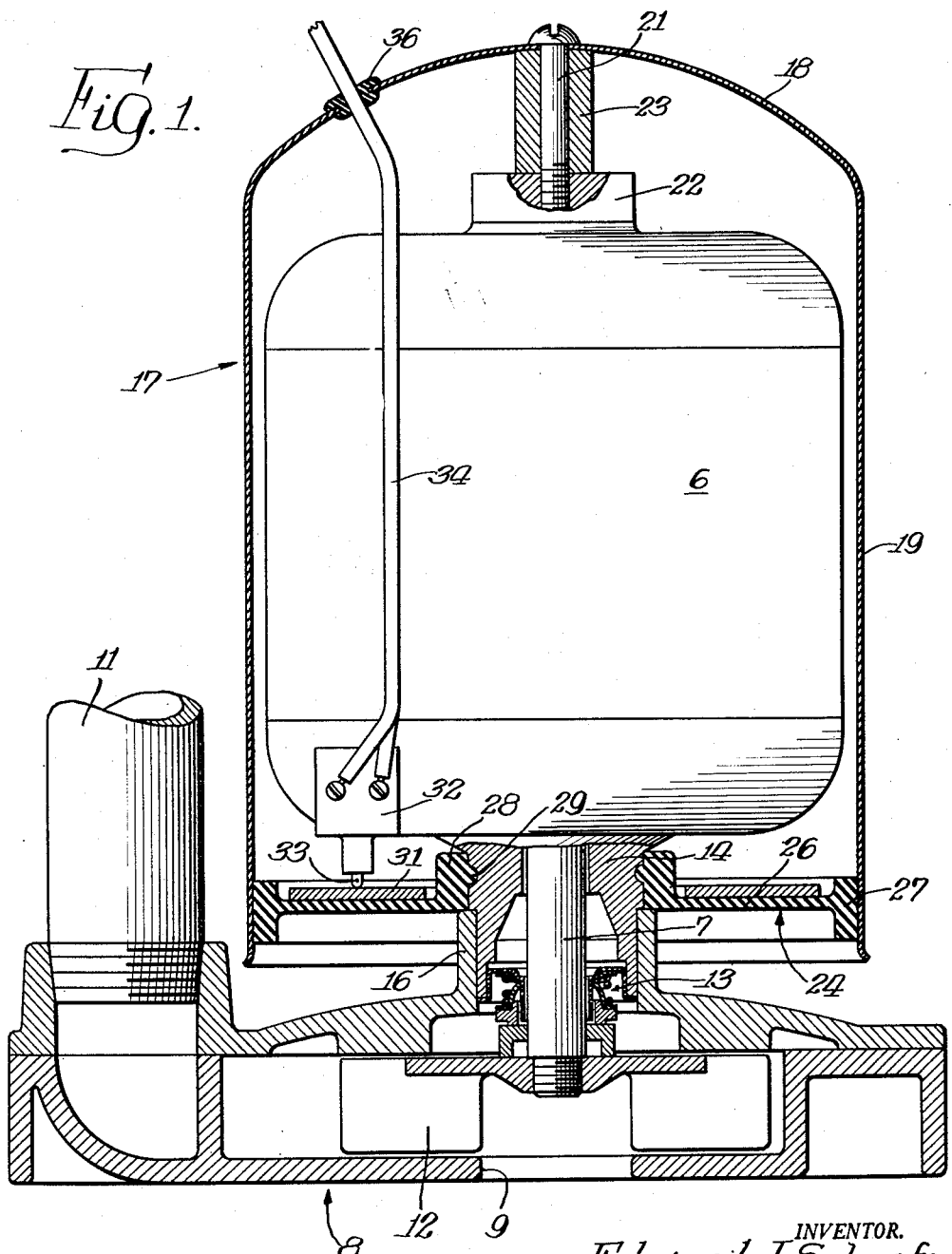
Fig. 1 is a vertical sectional view of a sump pump arrangement comprising one specific embodiment of my invention.

In brief, my invention includes the combination of a sump pump with a submersible electric motor connected directly thereto and mounted in close proximity to the pump unit. In order to protect the motor and render the same submersible I provide an enclosure for the motor including diaphragm means which is deflectable or distortable in response to changes of water level in the sump whereby to actuate a control switch for the motor. As will hereinafter appear, in one form of the invention the diaphragm means may conveniently constitute an end portion of the motor enclosure.

Referring first to Fig. 1 of the drawings, wherein one specific embodiment of my invention is shown merely by way of illustration, the device comprises an electric motor 6 of a conventional type having a rotor shaft 7 extending downwardly from the lower end thereof. Disposed below the motor 6 and immediately adjacent thereto is a centrifugal pump unit 8 of a conventional type having an inlet 9 and an outlet 11. The pump impeller, indicated at 12, is secured at the lower end of the shaft 7 and the latter is provided with a suitable rotating seal 13 to prevent entry of water to the motor through the shaft outlet. The lower hub portion, indicated at 14, of the motor 6 is received telescopically within and secured to the shaft opening, indicated at 16, of the pump casing so that the motor 6 is rigidly supported by the pump casing. The structural details of the motor 6 and the pump unit 8 do not form part of the present invention and accordingly need not be described further.

Surrounding the motor 6 for rendering the latter submersible is an enclosure, indicated generally at 17, in the form of a metal casing or housing structure fitting over the motor and having a dome-shaped closed upper end 18 and a depending cylindrical skirt portion 19 which is open at its lower end. The motor enclosure 17 is rigidly supported on the motor 6 by means of a screw 21 extending through the dome-shaped upper end 18 and threaded into the upper end or hub portion, indicated at 22, of the motor. A tubular collar 23 is disposed around the screw 21 between the hub 22 and the upper end of the enclosure 17 thereby acting as a spacer to position the enclosure 17 in any desired vertical position relative to the motor 6. In other words, the extent to which the skirt portion 19 of the enclosure 17 extends below the lower end of the motor 6 can be regulated by varying the length of the collar or spacer 23.

The open lower end of the enclosure 17 is closed by means of an annular deflectable diaphragm 24 which is preferably formed from a suitable resilient or flexible material such as rubber or the like. The diaphragm 24 has an annular flat portion 26 adapted to be deflected in either direction in response to changes in differential pressure, as hereinafter described in detail. The outer periphery of the diaphragm 24 is formed with a thickened upright flange 27 integral with the flat portion 26 and extending upwardly and downwardly therefrom. The flange 27 is securely fastened around its periphery, as by a suitable adhesive material, to the inner wall of the skirt portion 19 of the enclosure 17. The diaphragm 24 is also formed around its inner periphery with an integral thickened flange portion 28 which extends upwardly from the flat portion 26 and is provided with a circumferential bead 29 which seats tightly in a complementary annular groove in the lower hub portion 14 of the motor 6. It will be seen that the diaphragm 24, being sealed to the skirt portion 19 of the enclosure 17 and fitting snugly around the lower hub portion 14 of the motor 6, thereby forms with the enclosure 17 a water-tight casing which renders the motor 6 submersible. An annular contact plate 31 of rigid material such as metal is supported on the flat portion 26 of the diaphragm 24 for providing firm and positive contact with a switch-operating element, as described below.

For automatically regulating the operation of the motor 6, a control switch 32 having a movable spring-pressed operating member or button 33 is mounted adjacent the lower portion of the motor 6 with the operating button 33 facing the annular contact plate 31 in operative relation therewith.

An electric wire 34 for conducting current to the motor 6 extends through a seal 36 in the enclosure 17 and is connected to the switch 32. The switch 32 is of a type in which only a relatively slight movement of the operating button 33, e. g. 1/32 of an inch, is sufficient to cause actuation of the switch between "on" and "off" positions.

It will be understood that the enclosure 17 is rigidly secured to the motor 6 and therefore cannot move, but the diaphragm 24 is deflectable in response to changes in the differential fluid pressure acting thereon, i. e. the pressure of the trapped air within the enclosure 17 acting on the inside of the diaphragm and the water pressure acting on the outside thereof. Thus, as the water level in the sump rises, the diaphragm 24 is deflected upwardly as a result of the pressure of the increased head of water outside the enclosure 17. Upon upward movement of the diaphragm 24, the annular plate 31 presses the operating button 33 of the switch 32 whereby to complete the electrical circuit for the motor 6 and thereby start the pump 8 in operation. Similarly, as the water level in the sump recedes during the operation of the pump 8, the external fluid pressure decreases and the diaphragm 24, under the influence of the spring-pressed switch button 33 and the weight of the plate 31, moves downwardly to release the button 33 and shut off the motor.

In Fig. 2 of the drawing I have shown a modified form of the invention wherein the deflectable diaphragm means is disposed adjacent the upper end of the motor and does not form an end closure for the lower end of the motor enclosure as in Fig. 1. Thus, the motor 6 is provided with an inverted cup-shaped shell or enclosure 41 having a closed upper end 42 and rigidly mounted on the motor 6 by means of a plurality of flanges or brackets 43 which are spaced circumferentially to permit open communication within the enclosure 41. A generally circular diaphragm 44 is secured within the enclosure 41 above the upper end of the motor 6 but below the closed upper end 42 of the enclosure. The diaphragm 44 is formed with a deflectable central portion 46 and a peripheral flange 47 which is sealed to the wall of the enclosure 41 thereby defining a water-tight compartment between the diaphragm 44 and the closed end 42 of the enclosure 41. A control switch 48 having a movable operating button 49 is rigidly mounted at the underside of the closed end 42 with the operating button 49 disposed in operating position relative to the diaphragm 44. Suitable electrical conductors, indicated at 51 and 52, extend through suitable seal means in the enclosure 41 and the diaphragm 44 for conducting electric current to the switch 48 and the motor 6.

It will be seen that in the form of the invention shown in Fig. 2, the diaphragm 44 will be deflected in response to changes in water level outside the enclosure 41, but the enclosure 41, which extends downwardly below the lower end of the motor, functions generally in the manner of a diving bell so that a substantial volume of trapped air serves to transmit the water pressure to the underside of the diaphragm 44. The lower end of the skirt portion of the enclosure 41 extends downwardly below the lower end of the motor 6 a sufficient distance to prevent water from entering the motor by reason of the volume of air trapped between the diaphragm 44 and the water level. Thus, it is unnecessary to provide a positive seal for the lower end of the motor enclosure in this form of the invention. The switch 48 is protected from contact with water or water vapor by reason of its location in the water-tight compartment defined between the diaphragm 44 and the upper closed end 42 of the enclosure 41. The operation of the device is otherwise generally similar to the operation hereinbefore described in connection with Fig. 1.

Fig. 3 of the drawing illustrates still another modification of my invention. In this modification, the motor is completely surrounded by a lower water-tight portion of the casing or housing structure, as indicated at 60, so that the motor is rendered submersible. However, the motor enclosure is also provided with an upper portion or dome 61 which is rigidly secured to the lower portion 60, as by welding at 62. A diaphragm 63 is provided similar to the diaphragm 64 in the Fig. 2 modification. Similarly, a control switch 64 is mounted in the water-tight compartment defined between the diaphragm 63 and the upper end of the dome 61, the operating button of the switch 64 being adapted to be actuated upon deflection of the diaphragm 63. This form of the invention differs, however, from the Fig. 2 modification in that a plurality of apertures 66 are provided in the wall of the dome portion 61 below the diaphragm 63 in order to permit water from the sump to enter the space beneath the diaphragm 63 for actuating the latter. Thus, it will be seen that the diaphragm 63 is deflectable in response to variations in the water level outside the enclosure comprising the lower motor-sealing portion 60 and the upper dome portion 61.

Although the invention has been described in connection with certain specific structural embodiments, it will be understood that various alternative and equivalent structures may be resorted to without departing from the scope of the invention as defined in the appended claims.

I claim:

1. In a motor driven sump pump, an electric motor, a stationary housing structure around said motor, a control switch for said motor rigidly mounted within said housing structure, and a diaphragm disposed in deflectable relation to said housing structure and operatively engageable with said switch for actuating the latter in response substantially solely to changes in liquid level outside said housing structure.

2. In a motor driven sump pump, an electric motor, a housing surrounding said motor and rigidly secured thereto, said housing being closed at its upper end and open at its lower end, a control switch for said motor rigidly mounted within said housing, and flexible diaphragm means secured adjacent one end of said housing in operative relation with said switch and movable in response to changes in liquid level outside said housing for actuating said switch.

3. In a motor driven sump pump, an electric motor, a housing surrounding said motor and rigidly secured thereto, said housing being closed at its upper end and open at its lower end, flexible diaphragm means secured adjacent one end of said housing, and a control switch for said motor rigidly mounted within said housing between said diaphragm means and the closed end of said housing, said switch being disposed in operative relation with said diaphragm means and said diaphragm means being movable in response to changes in liquid level outside said housing for actuating said switch.

4. In a motor driven sump pump, an electric motor, housing structure closed at its upper end and rigidly secured to said motor with the closed upper end thereof spaced above said motor, a flexible diaphragm extending transversely across said housing structure above said motor and in spaced relation below the closed upper end of said housing structure, and a control switch for said motor disposed in operative relation with said diaphragm in the space between said diaphragm and said closed upper end, said diaphragm being deflectable in response to changes in liquid level outside said housing structure for actuating said switch.

5. In a motor driven sump pump, an electric motor, a generally cylindrical housing structure surrounding said motor and having a closed upper end, said housing structure being mounted rigidly on said motor, a circular diaphragm extending transversely across said housing structure adjacent said closed upper end thereof and above said motor, said diaphragm being sealed around its outer periphery to the inner wall of the cylindrical portion of said housing structure and being disposed in axially spaced relation below the closed upper end of said housing structure whereby to define a water-tight compartment between said diaphragm and said closed upper end, a control switch for said motor rigidly fastened to said closed upper end and having an operating member extending into operative engagement with the upper side of said diaphragm, and means for transmitting fluid pressure outside said housing structure to the underside of said diaphragm whereby to actuate said switch in response to changes in liquid level outside said housing structure.

6. In a motor driven sump pump, an electric motor, a housing surrounding said motor and rigidly secured thereto, said housing having its upper end closed and its lower end open, flexible diaphragm means secured in sealed relation to said housing and to said motor adjacent the lower ends thereof whereby to provide a lower end closure for said housing, and a control switch for said motor mounted within said housing adjacent said diaphragm means and in operative relation with the latter, said diaphragm means being deflectable in response to changes in liquid level outside of said housing for actuating said switch.

7. In a motor driven sump pump, an electric motor, a housing surrounding said motor and rigidly secured thereto, said housing having its upper end closed and its lower end open, an annular diaphragm secured in sealed relation around its outer periphery to said housing adjacent the lower end of the latter, said diaphragm being secured in sealed relation around its inner periphery to the lower end of said motor whereby to provide a lower end closure for said housing, and a control switch for said motor mounted within said housing and having an operating member extending into operative engagement with the inner side of said diaphragm, said diaphragm being deflectable in response to changes in liquid level outside said housing for actuating said switch.

8. In a motor driven sump pump, an electric motor, a housing fitted over said motor and rigidly secured thereto, said housing having a closed upper end and an open lower end, a flexible diaphragm extending across said housing between the closed upper end thereof and the upper end of said motor whereby to define a water-tight compartment between said diaphragm and the closed upper end of said housing, and a control switch for said motor mounted within said compartment in operative relation with said diaphragm, said diaphragm being deflectable in response to changes in liquid level outside said housing for actuating said switch.

9. In a motor driven sump pump, an electric motor, casing structure for said motor having a lower water-tight portion completely surrounding said motor and rigidly mounted thereon whereby to render the motor submersible, said casing structure also having an upper portion disposed above said water-tight portion and having a closed upper end, a flexible diaphragm extending across said upper portion in spaced relation below the closed upper end thereof whereby to define a water-tight compartment between said diaphragm and said closed upper end, and a control switch for said motor mounted within said compartment in operative relation with said diaphragm, said upper portion of said casing structure being provided with aperture means below said diaphragm whereby to permit said diaphragm to be deflected in response to changes of liquid level outside said casing structure for actuating said switch.

10. In a motor driven sump pump, an electric motor, housing structure rigidly secured around said motor for rendering the latter submersible, a control switch for said motor rigidly mounted within said housing structure and having a movable operating member, and a diaphragm mounted in deflectable relation to said housing structure and operatively engageable with said operating member for actuating said switch, said housing structure having a portion thereof open to outside liquid whereby said diaphragm is deflectable in response to changes in liquid level outside said housing structure.

References Cited in the file of this patent

UNITED STATES PATENTS

| | | |
|---|---|---|
| 2,002,916 | Mendenhall et al. | May 28, 1935 |
| 2,229,986 | Page | Jan. 28, 1941 |

FOREIGN PATENTS

| | | |
|---|---|---|
| 173,010 | Great Britain | Dec. 19, 1921 |